US012762371B2

(12) United States Patent
Huang et al.

(10) Patent No.: US 12,762,371 B2
(45) Date of Patent: Oct. 13, 2026

(54) DATA PROCESSING METHOD AND DEVICE FOR NEURAL NETWORK MODEL BASED ON OPERATOR FUSION

(71) Applicant: SHENZHEN CORERAIN TECHNOLOGIES CO., LTD., Guangdong (CN)

(72) Inventors: Jiongkai Huang, Guangdong (CN); Kuen Hung Tsoi, Guangdong (CN); Xinyu Niu, Guangdong (CN)

(73) Assignee: SHENZHEN CORERAIN TECHNOLOGIES CO., LTD., Shenzhen (CN)

( * ) Notice: Subject to any disclaimer, the term of this patent is extended or adjusted under 35 U.S.C. 154(b) by 932 days.

(21) Appl. No.: 17/800,689

(22) PCT Filed: Jan. 26, 2021

(86) PCT No.: PCT/CN2021/073758
§ 371 (c)(1),
(2) Date: Sep. 25, 2023

(87) PCT Pub. No.: WO2021/164506
PCT Pub. Date: Aug. 26, 2021

(65) Prior Publication Data
US 2024/0220765 A1 Jul. 4, 2024

(30) Foreign Application Priority Data
Feb. 18, 2020 (CN) ........................ 202010099460.X

(51) Int. Cl.
*G06N 3/04* (2023.01)

(52) U.S. Cl.
CPC ...................................... *G06N 3/04* (2013.01)

(58) Field of Classification Search
None
See application file for complete search history.

(56) References Cited

U.S. PATENT DOCUMENTS

2020/0210821 A1* 7/2020 Guo ..................... G06N 3/0464

FOREIGN PATENT DOCUMENTS

| | | | |
|---|---|---|---|
| CN | 109754073 | A | 5/2019 |
| CN | 110321999 | A | 10/2019 |
| CN | 110689116 | A | 1/2020 |
| CN | 111260019 | A | 6/2020 |

OTHER PUBLICATIONS

PCT/CN2021/073758 International Search Report dated Apr. 15, 2021.

* cited by examiner

*Primary Examiner* — Daniel T Pellett
(74) *Attorney, Agent, or Firm* — MUNCY, GEISSLER, OLDS & LOWE, P.C.

(57) ABSTRACT

A data processing method and device for a neural network model based on operator fusion are provided. The method includes: acquiring multiple neural network operators in a neural network model; fusing the multiple neural network operators according to a preset rule to obtain fused neural network operators; combining the fused neural network operators into computation instructions; and performing computation on the computation instructions by using a computation engine.

17 Claims, 3 Drawing Sheets

DATA PROCESSING METHOD AND DEVICE FOR NEURAL NETWORK MODEL BASED ON OPERATOR FUSION

CROSS-REFERENCE TO RELATED APPLICATION(S)

This is a national stage application filed under 37 U.S.C. 371 based on International Patent Application No. PCT/CN2021/073758, filed Jan. 26, 2021, which claims priority to Chinese Patent Application No. 202010099460.X filed Feb. 18, 2020, the disclosures of which are incorporated herein by reference in their entireties.

FIELD

Embodiments of the present disclosure relate to the field of compute card technologies, for example, to a data processing method for a neural network model, a data processing apparatus for a neural network model, a device, and a storage medium.

BACKGROUND

With the development of artificial intelligence technology, many scalable deep learning systems are developed, those deep learning systems can be configured to provide a variety of neural network models that can be run on processors such as central processing units (CPUs) or graphics processing units (GPUs). Deep learning has a variety of frameworks, and the iteration update of framework versions is relatively fast, the fusion technology needs to be designed according to the architectural characteristics of different frameworks.

When a processor is running a neural network model, for example, when running the Caffe network model, the processor compiles and parses multiple computation nodes in the neural network model separately each time, and performs operations of the multiple computation nodes in a certain form according to the structural form of this neural network model. When operations of the above-described computation nodes are performed on different processors, it needs to be frequently switched between the different processors, causing more times of communication between the different processors and more times of data copying, which reduces the operation speed of the neural network model.

SUMMARY

A data processing method for a neural network model, a data processing apparatus for a neural network model, a device and a storage medium are provided according to the present disclosure, to increase rate of speed of data stream.

A data processing method for a neural network model is provided according to an embodiment of the present disclosure, which includes: acquiring multiple neural network operators in a neural network model;

- fusing the multiple neural network operators according to a preset rule to obtain fused neural network operators;
- combining the fused neural network operators into computation instructions; and
- using a computation engine to perform computation on the computation instructions.

Optionally, before the fusing the multiple neural network operators according to a preset rule to obtain fused neural network operators, the method further comprises: determining whether the multiple neural network operators can be fused, and in response to a determination result in which the multiple neural network operators can be fused, fusing the multiple neural network operators according to the preset rule to obtain the fused neural network operators.

Optionally, after the determining whether the multiple neural network operators can be fused, the method further comprises: acquiring new neural network operators in response to a determination result in which the multiple neural network operators cannot be fused.

Optionally, the fusing the multiple neural network operators according to a preset rule to obtain fused neural network operators comprises: discharging the multiple neural network operators through convolution, activation function, pooling/up-sampling, shortcut, activation function, and global pooling in sequence, and fusing discharged neural network operators to obtain the fused neural network operators.

Optionally, the using a computation engine to perform computation on the computation instructions comprises: determining whether the computation instructions correspond to only one data stream operation, and using a computation engine to perform computation on the computation instructions in response to a determination result in which the computation instructions correspond to only one data stream operation.

Optionally, after the determining whether the computation instructions correspond to only one data stream operation, the method further comprises: recombining computation instructions according to the fused neural network operators in response to a determination result in which the computation instructions correspond to not only one data stream operation.

Optionally, before the using a computation engine to perform computation on the computation instructions, the method further comprises: parsing the computation instructions.

In an embodiment, a data processing apparatus for a neural network model is further provided according to an embodiment of the present disclosure, the apparatus includes: an acquisition module, a fusion module, a combination module and a computation module.

The acquisition module is configured to acquire multiple neural network operators in the neural network model.

The fusion module is configured to fuse the multiple neural network operators according to a preset rule to obtain fused neural network operators.

The combination module is configured to combine the fused neural network operators into computation instructions.

The computation module is configured to use a computation engine to perform computation on the computation instructions.

A neural network data processing device is further provided according to an embodiment of the present disclosure, the device includes one or more processors; and

- a storage apparatus configured to store one or more programs,
- the one or more programs, when being executed by the one or more processors, cause the one or more processors to implement the method described above.

In an embodiment, a computer-readable storage medium is further provided according to an embodiment of the present disclosure, the computer-readable storage medium having a computer program stored thereon, the computer program comprising a program instruction, and the program instruction, when being executed by a processor, implements the method described above.

Embodiments of the present disclosure disclose a data processing method for a neural network model, a data processing apparatus for a neural network model, a device, and a storage medium. The method includes: acquiring multiple neural network operators in a neural network model; fusing the multiple neural network operators according to a preset rule to obtain fused neural network operators; combining the fused neural network operators into computation instructions; and using a computation engine to perform calculation on the computation instructions. The data processing method for the neural network model according to the present disclosure speeds up the computation process and solves the problem that the computation of data stream cannot be performed in a high speed in the related art, and realizes that the algorithm instruction, after reaching a drive program, is parsed into multiple operators which can be determined as one data stream process, and multiple data stream processes are implemented as a whole into data streams of one neural network, so that the data stream speed can reach the highest rate.

DETAILED DESCRIPTION

Figure 1:
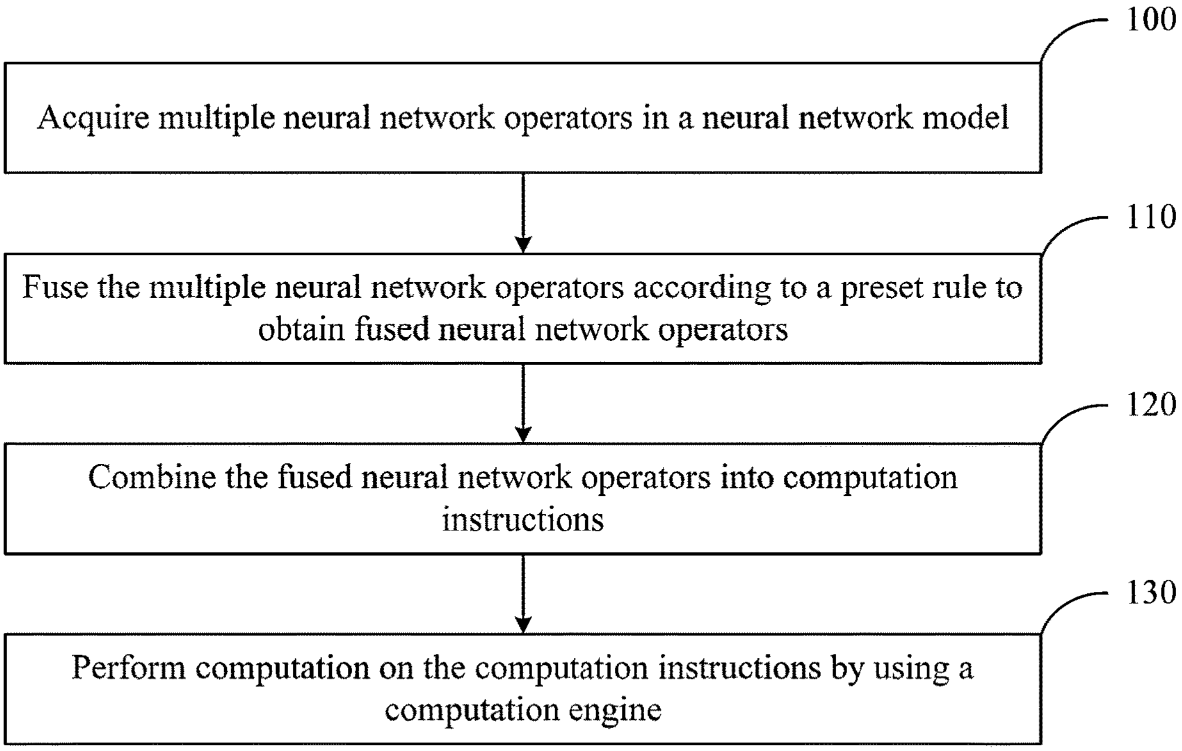
FIG. 1 is a flowchart of a data processing method for a neural network model according to an embodiment of the present disclosure.

The present disclosure is further described in detail hereinafter in conjunction with the drawings and embodiments. It is to be understood that the embodiments described herein are intended to illustrate rather than limiting the present disclosure. It is to be noted that to facilitate description, only part, not all, of structures related to the present disclosure are illustrated in the drawings.

The present disclosure is described hereinafter with reference to the drawings and embodiments. The embodiments described herein are only for explaining the present disclosure, rather than limiting the present disclosure. For convenience of description, only part of structures rather than all structures related to the present disclosure are shown in the drawings.

Some exemplary embodiments are described as processes or methods depicted by the flowcharts. Although the flowcharts depict multiple operations as a sequential process, the multiple operations herein may be performed in parallel, concurrently, or simultaneously. Furthermore, a sequence of the multiple operations may be rearranged. After the multiple operations are operated, the process may be terminated, but may also include additional operations which are not included in the drawings. The process herein may correspond to a method, a function, a procedure, a subroutine, a subprogram, or the like.

The terms “first,” “second,” and etc. may be used herein to describe various directions, various acts, various operations or various elements, and etc., but are not used to limit these directions, acts, operations or elements. The terms “first,” “second,” and etc. are only used to distinguish a first direction, a first act, a first operation or a first element from another direction, another act, another operation or another element respectively. For example, a first computation engine may be referred to as a second computation engine, and similarly, a second computation engine may be referred to as a first computation engine. Both the first computation engine and the second computation engine are computation engines, but the first computation engine and the second computation engine are not the same computation engine. The terms “first”, “second”, etc. should not be understood as indicating or implying relative importance or implying the number of the indicated technical features. Thus, features with prefixes “first” or “second” may expressly or implicitly include one or more of those features. In the description of this disclosure, “plurality/multiple” means at least two, such as two, three, etc., unless otherwise expressly defined.

First Embodiment

FIG. 1 is a flowchart of a data processing method for a neural network model according to an embodiment of the present disclosure. The embodiment is applicable to fusing computation operators to speed up computation of data streams, the method includes operations 100 to 130.

Operation 100 may include acquiring multiple neural network operators in a neural network model.

In an embodiment, in a neural network model, one neural network model includes multiple algorithm instructions, one algorithm instruction includes multiple neural network operators, and an operation process includes multiple neural network operators of a multi-layer structure and connection relationships among the multiple neural network operators. After a computation engine processes computation instructions of the neural network model, the computation engine acquires information of all the neural network operators, including operation symbols, operation parameters, and connection relationships among multiple operators and the like.

Operation 110 may include fusing the multiple neural network operators according to a preset rule to obtain fused neural network operators.

In this embodiment, multiple neural network operators in the neural network are fused according to a preset fusion rule (i.e., a preset rule). The fusion process includes selecting a target operator from multiple neural network operators, acquiring a connection relationship between the target operator and a subsequent operator, and determining a fusion relationship according to the connection relationship.

In an example, the first neural network model includes a multi-layer structure, and an operation process involves multiple neural network operators and connection relationships among the multiple neural network operators of the multi-layer structure. Each layer of the multi-layer structure corresponds to at least one neural network operator. An architecture fusion apparatus of the neural network model generates a computation graph of the first neural network model according to the operation process, which includes: the architecture fusion apparatus of the neural network model selects a target operator from the multiple neural network operators, where the target operator is a starting node of a directed acyclic graph; the architecture fusion apparatus of the neural network model acquires a subsequent operator of the target operator and a connection relationship between the target operator and the child operator; and, the architecture fusion apparatus of the neural network model connects a lower layer node corresponding to the subsequent operator to the starting node according to the connection relationship between the target operator and the subsequent operator to obtain the directed acyclic graph. The architecture fusion apparatus of the neural network model determines N fusible nodes and M non-fusible nodes in the directed acyclic graph according to information of at least two processing units corresponding to the multiple neural network operators. The neural network operators corresponding to the fusible nodes are operators executed by an image processing unit (IPU), and both N and M are integers greater than 1. The architecture fusion apparatus of the neural network model performs fusion segment division on the N fusible nodes to obtain a directed acyclic graph subjected to the fusion segment division, where the directed acyclic graph subjected to the fusion segment division includes P fusion segments, and P is an integer greater than or equal to 1 and less than or equal to N. The architecture fusion apparatus of the neural network model acquires Q paths of the M non-fusible nodes and M node-layers of the M non-fusible nodes in the directed acyclic graph, where Q is greater than the M. and each non-fusible node corresponds to at least one path and one node-layer. The architecture fusion apparatus of the neural network model simplifies the directed acyclic graph subjected to the fusion segment division according to the Q paths and the M node-layers to obtain a fused directed acyclic graph. The neural network operators corresponding to the non-fusible nodes are operators not executed by the IPU. Each fusion segment is a subgraph of the directed acyclic graph, at least one operator corresponding to at least one fusible node in the same fusion segment is executed by the IPU. The execution of the at least one operator by the IPU does not need to switch processing units, or does not need to copy data for multiple times. In some embodiments, an implementation in which the architecture fusion apparatus of the neural network model acquires the Q paths of the M non-fusible nodes and the M node-layers of the M non-fusible nodes in the directed acyclic graph is as follows: the architecture fusion apparatus of the neural network model starts to traverse the directed acyclic graph layer by layer from a first node-layer of the directed acyclic graph, acquires at least one path corresponding to each non-fusible node and one node-layer corresponding to each non-fusible node, to obtain the Q paths of the M non-fusible nodes and the M node-layers of the M non-fusible nodes in the directed acyclic graph. An implementation in which the architecture fusion apparatus of the neural network model acquires node connection relationships among the N fusible nodes; and the architecture fusion apparatus of the neural network model performs fusion segment division on the N fusible nodes includes: in a case where a fusible node m and a fusible node n have a node connection relationship that they are adjacent nodes in a same node-layer or that they are a parent node and a child node in different node-layers, the architecture fusion apparatus of the neural network model divides the fusible node m and the fusible node n into a same fusion segment, where either the fusible node m or the fusible node n is one of the N fusible nodes. An implementation in which the architecture fusion apparatus of the neural network model simplifies the directed acyclic graph subjected to the fusion segment division according to the Q paths and the M node-layers includes: the architecture fusion apparatus of the neural network model acquires node location relationships among the M non-fusible nodes; in a case where an operator corresponding to a non-fusible node p is the same as an operator corresponding to a non-fusible node q, the architecture fusion apparatus of the neural network model determines the node location relationship between the non-fusible node p and the non-fusible node q, where either the non-fusible node p or the non-fusible node q is one of the M non-fusible nodes; in a case where the node location relationship between the non-fusible node p and the non-fusible node q is that the non-fusible node p and the non-fusible node q are located at different node-layers and in different paths, the architecture fusion apparatus of the neural network model directs an edge pointing to the non-fusible node p to the non-fusible node q, adds an edge of the non-fusible node q pointing to a node to which an edge of the non-fusible node p is pointed, and deletes the non-fusible node p. An operator corresponding to the non-fusible node q receives data sent by different nodes at different times and performs computation on the data received, where the number of the different nodes is same as the number of the different times. In a case where the node location relationship between the non-fusible node p and the non-fusible node q is that the non-fusible node p and the non-fusible node q are located at different node-layers and in different paths, the architecture fusion apparatus of the neural network model directs an edge pointing to the non-fusible node q to the non-fusible node p, adds an edge of the non-fusible node p pointing to a node to which an edge of the non-fusible node q is pointed, and deletes the non-fusible node q. An operator corresponding to the non-fusible node p receives data sent by different nodes at different times and performs computation on the data received, where the number of the different nodes is same as the number of the different times.

Operation 120 may include combining the fused neural network operators into computation instructions.

In this embodiment, in the neural network model, one algorithm instruction includes multiple neural network operators, and the fused neural network operators are combined into multiple computation instructions, which is conductive to that an appropriate number of computation engines can be allocated for computation. In an embodiment, an algorithm instruction may be different from a computation instruction, and one or more algorithm instructions may be included in one computation instruction.

Operation 130 may include using a computation engine to perform computation on the computation instructions.

In this embodiment, according to the number of computation instructions in operation 120, an appropriate number of computation engines are selected to perform computation on the computation instructions. In this case, at least one computation engine is selected, and the number of the computation engines selected is determined based on the priority of the computation task. The larger the number of the computation engines is, the higher the speed of processing the computation task is. In an example, in a deep learning computation, multiple computation engines are used to identify an image, and in this case, when the number of the computation engines used is larger, the speed of comparing the image with images in a database is higher, and a comparison result is output faster.

According to the embodiments of the present disclosure, multiple neural network operators in a neural network model are acquired, the multiple neural network operators are fused according to a preset rule to obtain fused neural network operators, the fused neural network operators are combined into computation instructions; and a computation engine is used to compute the computation instructions, which speeds up the computation process and solves the problem that the computation of data stream cannot be performed in a high speed in the related art, and realizes that after computation instructions reach a drive program, multiple operators are parsed into one data stream process, so that multiple data stream processes as a whole can implement one data stream of a neural network, enabling the data stream to be processed with a highest efficiency.

Second Embodiment

Figure 2:
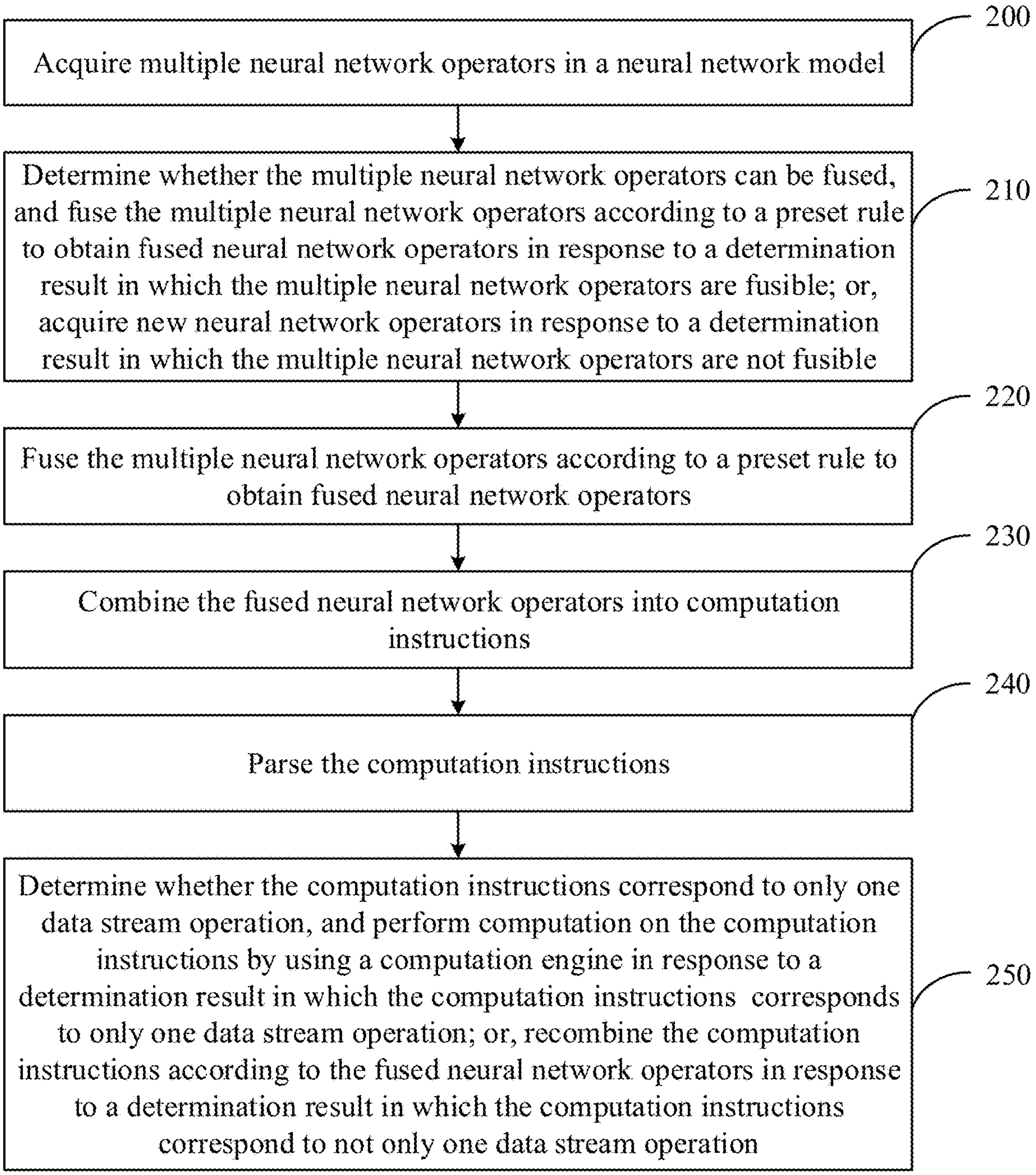
FIG. 2 is a flowchart of a data processing method for a neural network model according to an embodiment of the present disclosure.

FIG. 2 is a flowchart of a data processing method for a neural network model according to an embodiment of the present disclosure. This embodiment is an optional embodiment based on the first embodiment. In one implementation, the method includes operations 200 to 250.

Operation 200 may include acquiring multiple neural network operators in a neural network model.

Operation 210 may include determining whether the multiple neural network operators can be fused, and in response to a determination result in which the multiple neural network operators can be fused, fusing the multiple neural network operators according to a preset rule to obtain fused neural network operators; and in response to a determination result in which the multiple neural network operators cannot be fused, acquiring new neural network operators.

In this embodiment, before fusing the neural network operators, it is necessary to determine whether these neural network operators can be fused. Regarding the fusing, reference may be made to the examples of the first embodiment. When the neural network operators can be fused, the neural network operators are discharged (processed) through convolution, activation function, pooling/up-sampling, shortcut, activation function, and global pooling in sequence, and the discharged neural network operators are fused to obtain fused neural network operators. Convolution refers to a convolution layer in a neural network, which is a core block of a convolution network by which most heavy computation work is performed in the neural network, and parameters in the convolution layer are composed of a set of learnable filters. The function of pooling is to gradually reduce a size of the space represented to reduce the number of parameters and the amount of computation in the network, thereby controlling overfitting. The pooling layer runs independently on each depth slice of the input and resizes it spatially by using the maximum MAX operation. The activation function is typically used between layers of the neural network, and is used to convert an output of an upper layer and input the converted output to a lower layer. Without nonlinear characteristics introduced by the activation function, the neural network is only equivalent to matrix multiplication of an original perceptron. The activation function includes nonlinear characteristics. i.e., when the activation function is nonlinear, it can be proved that a two-layer neural network can be approximated by any complex function. The activation function has characteristics of being continuously differentiable: since the neural network is trained by a gradient-based optimization method, with a mathematical basis of being continuously differentiable, the selected activation function is also required to be continuously differentiable. The stepped activation function is not differentiable (i.e., discontinuous) at point 0 and has derivatives of 0 at all points except the point 0, which is not applicable to the gradient-based method. When a value range of the activation function is finite, the gradient-based training method tends to be more stable because feature representations are more significantly influenced by limited weights. When the value range of the activation function is infinite, a training is usually more efficient because the feature representations will significantly affect most of the weights, in which case a smaller learning rate is generally required. The activation function has monotonicity, and when the activation function is monotonic, an error surface of a single layer network must be convex.

If the current neural network operators cannot be fused, new neural network operators are acquired for fusion. After the new neural network operators are obtained, the neural network operators are discharged according to a preset rule, that is, through convolution, activation function, pooling/up-sampling, shortcut, activation function, global pooling in sequence, and it is determined whether the discharged neural network operators can be fused. If the discharged neural network operators can be fused, the neural network operators are fused according to the fusing described in the first embodiment.

Operation 220 may include fusing the multiple neural network operators according to a preset rule to obtain fused neural network operators.

Operation 230 may include combining the fused neural network operators into computation instructions.

Operation 240 may include parsing the computation instructions.

In this embodiment, the parsing the computation instructions, includes splitting the computation instructions into multiple neural network operators, determining one or more neural network data streams according to the neural network operators, and allocating a corresponding number of computation engines according to the neural network data streams for computation processing.

Operation 250 may include determining whether the computation instructions correspond to only one data stream operation, and using a computation engine to perform computation on the computation instructions in response to a determination result in which the computation instructions correspond to only one data stream operation; and recombining computation instructions according to the fused neural network operators in response to a determination result in which the computation instructions correspond to not only one data stream operation.

In this embodiment, it is determined whether the neural network data stream obtained after the computation instructions is parsed is the only one data stream. In the neural network computation, the computation engine can generally process only one data stream at one time. Therefore, when there are multiple data streams at the same time, the computation time of neural network may be adversely affected. First, it is determined whether the neural network data stream obtained is the only one data stream, and if the determination result is yes, a computation engine is directly allocated to perform computation processing on it, and computing only one neural network data stream at one time can greatly save the processing time of the neural network, which can improve the data stream processing efficiency. If the determination result is not, the neural network operators obtained by splitting the computation instructions are fused with new neural network operators to form new computation instructions. The new multiple computation instructions are then recombined, and the computation instructions subjected to the recombination is further determined whether the computation instructions correspond to only one data stream.

In the embodiments of the present disclosure, multiple neural network operators in a neural network model are obtained; whether the multiple neural network operators can be fused is determined, and if the determination result is yes, the multiple neural network operators are fused according to the preset rule to obtain fused neural network operators; and if the determination result is not, it is continued to acquire new neural network operators; then the multiple neural network operators are fused according to the preset rule to obtain fused neural network operators; the fused neural network operators are combined into computation instructions; the computation instruction is parsed; whether the computation instructions correspond to only one data stream operation is determined, and if the determination result is yes, a computation engine is used to perform computation on the computation instruction. If the determination result is not, computation instructions are recombined according to the fused neural network operators, which speeds up the computation process and solves the problem that the computation of data stream cannot be performed in a high speed in the related art, and realizes that after the algorithm instructions reach a drive program, multiple operators are parsed into one data stream process, so that multiple data stream processes as a whole can implement one data stream of a neural network, enabling the data stream to be processed reach a highest efficiency.

Third Embodiment

Figure 3:
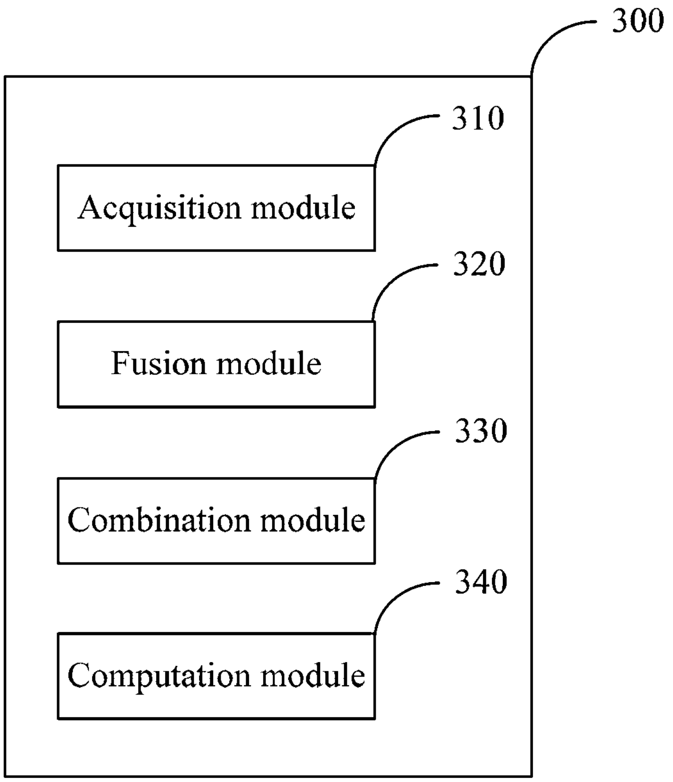
FIG. 3 is a schematic structural diagram of a data processing apparatus for a neural network model according to an embodiment of the present disclosure.

The data processing device of the neural network model according to the embodiments of the present disclosure may execute the method according to any of the embodiments of the present disclosure, and has function modules for executing the method and effects corresponding to the method. FIG. 3 is a schematic structural diagram of a data processing apparatus 300 for a neural network model according to an embodiment of the present disclosure. Referring to FIG. 3, the data processing apparatus 300 of the neural network model according to the embodiment of the present disclosure may include: an acquisition module 310, a fusion module 320, a combination module 330 and a computation module 340.

The acquisition module 310 is configured to acquire multiple neural network operators in the neural network model.

The fusion module 320 is configured to fuse the multiple neural network operators according to a preset rule to obtain fused neural network operators.

The combination module 330 is configured to combine the fused neural network operators into computation instructions.

The computation module 340 is configured to use a computation engine to perform computation on the computation instruction.

In an embodiment, the apparatus is further configured to: before the multiple neural network operators are fused according to a preset rule to obtain fused neural network operators, determine whether the multiple neural network operators can be fused, and in response to a determination result in which the multiple neural network operators can be fused, fuse the multiple neural network operators according to the preset rule to obtain fused neural network operators.

In an embodiment, the apparatus is further configured to, after determining whether the multiple neural network operators can be fused, continue acquiring new neural network operators in response to a determination result in which the multiple neural network operators cannot be fused.

In an embodiment, the fusion module is configured to discharge the multiple neural network operators through convolution, activation function, pooling/up-sampling, shortcut, activation function, and global pooling in sequence, and fuse the discharged neural network operators to obtain fused neural network operators.

In an embodiment, the computation module is configured to determine whether the computation instructions correspond to only one data stream operation, and to perform computation on the computation instruction by using a computation engine in response to a determination result in which the computation instructions correspond to only one data stream operation.

In an embodiment, the computation module is configured to, after determining whether the computation instructions correspond to only one data stream operation, recombine computation instructions according to the fused neural network operators in response to a determination result in which the computation instructions correspond to not only one data stream operation.

In an embodiment, the apparatus is further configured to parse the computation instruction.

In the data processing apparatus of the neural network model according to an embodiment of the present disclosure, multiple neural network operators in a neural network model are acquired; and the multiple neural network operators are fused according to a preset rule to obtain fused neural network operators; and the fused neural network operators are combined into a computation instruction; the computation engine is used to compute the computation instruction, which speeds up the computation process and solves the problem that the computation of data stream cannot be performed in a high speed in the related art, and realizes that the algorithm instruction, after reaching a drive program, is parsed into multiple operators which can be determined as one data stream process, and multiple data stream processes are implemented as a whole into data streams of one neural network, so that the data stream speed can reach the highest rate.

Fourth Embodiment

Figure 4:
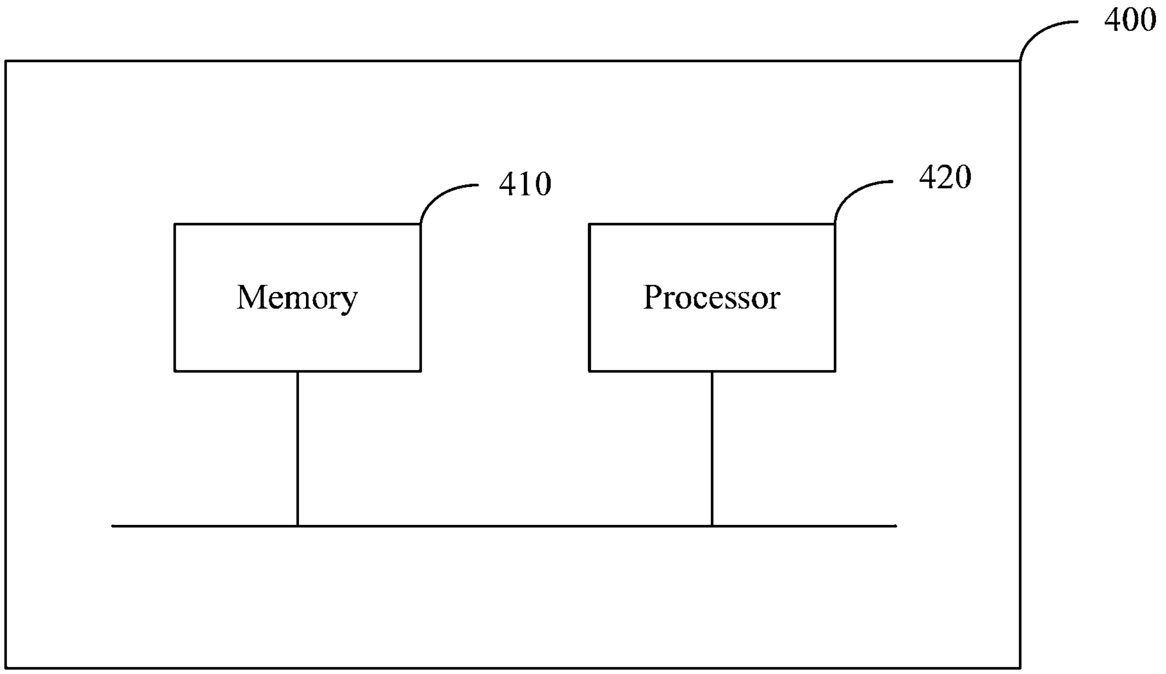
FIG. 4 is a schematic structural diagram of a computer device according to an embodiment of the present disclosure.

FIG. 4 is a schematic structural diagram of a computer device according to an embodiment of the present disclosure. As shown in FIG. 4, the computer device includes a memory 410 and a processor 420. The number of processors 420 in the computer device may be one or more, for example one processor 420 in an example in FIG. 4. The memory 410, the processor 420 in the device may be connected by a bus or other means, for example by a bus in FIG. 4.

The memory 410, as a computer-readable storage medium, may be configured to store software programs, computer-executable programs, and modules, such as program instructions/modules corresponding to the methods in the embodiments of the present disclosure, (for example, an acquisition module 310, a fusion module 320, a combination module 330, and a computation module 340 in a data processing apparatus of a neural network model). The processor 420 runs software programs, instructions and modules stored in the memory 410 to thereby executing various functional applications and data processing of the device/terminal/equipment, i.e., implementing the above-described method.

The processor 420 is configured to run the computer program stored in the memory 410, to implement:

acquiring multiple neural network operators in a neural network model;

fusing the multiple neural network operators according to a preset rule to obtain fused neural network operators;

combining the fused neural network operators into computation instructions; and using a computation engine to perform computation on the computation instruction.

In an embodiment, a computer device is provided according to the embodiment of the present disclosure, the computer program of the computer device is not limited to the above method operation, and may also perform the method according to any embodiment of the present disclosure.

The memory 410 may include a program storage area and a data storage area, where the program storage area may store an operation system, an application program required for at least one function; and the data storage area may store data or the like created according to the use of the terminal. In addition, the memory 410 may include a high-speed random access memory, and may further include a non-volatile memory, such as at least one magnetic disk storage device, a flash memory device, or other non-volatile solid state storage device. In some examples, memory 410 may include memory remotely disposed relative to processor 420, which may be connected to a device/terminal/device via a network. Examples of the preceding network include the internet, an intranet, a local area network, a mobile communication network and a combination thereof.

In the technical solution according to the embodiment of the present disclosure, multiple neural network operators in a neural network model are acquired; and the multiple neural network operators are fused according to a preset rule to obtain fused neural network operators; and the fused neural network operators are combined into a computation instruction; the computation engine is used to compute the computation instruction, which speeds up the computation process and solves the problem that the computation of data stream cannot be performed in a high speed in the related art, and realizes that the algorithm instruction, after reaching a drive program, is parsed into multiple operators which can be determined as one data stream process, and multiple data stream processes are implemented as a whole into data streams of one neural network, so that the data stream speed can reach the highest rate.

Fifth Embodiment

A storage medium including a computer-executable instruction is further provided according to a fifth embodiment of the present disclosure, the computer-executable instruction is used to execute the above method when being executed by a computer processor, the method includes:

acquiring multiple neural network operators in a neural network model;

fusing the multiple neural network operators according to a preset rule to obtain fused neural network operators;

combining the fused neural network operators into computation instructions; and using a computation engine to perform computation on the computation instruction.

In a storage medium including a computer-executable instruction according to an embodiment of the present application, the computer-executable instruction is not limited to the method operation as described above, and may also perform the method according to any embodiment of the present disclosure.

The computer readable storage medium according to the embodiments of the present disclosure may adopt any combination of one or more computer-readable media. The computer-readable medium may be a computer-readable signal medium or a computer-readable storage medium. The computer-readable storage medium can be, for example, an electrical, magnetic, optical, electromagnetic, infrared, or semiconductor system, apparatus or device, or a combination of the foregoing. Examples of computer-readable storage media include: electrical connections having one or more wires, portable computer disks, hard disks, random access memory (RAM), read-only memory (ROM), erasable programmable read-only memory (EPROM or flash memory), optical fiber, compact disc read only memory (CD-ROM), optical storage device, magnetic storage device, or any suitable combination of the foregoing. In this document, a computer-readable storage medium can be various tangible media that contain or store a program, the program can be used by or in connection with an instruction execution system, apparatus, or device.

The computer-readable signal medium may include a data signal propagated in a baseband or as part of a carrier wave, with computer-readable program code carried in the computer-readable signal medium. Such propagated data signals may take a variety of forms, including electromagnetic signals, optical signals, or any suitable combination of the foregoing. The computer-readable signal medium can also be computer-readable medium, other than the computer-readable storage medium, that can transmit, propagate, or transport the program for being used by or in connection with the instruction execution system, instruction execution apparatus, or device.

Program codes embodied on a storage medium may be transmitted by any suitable medium including a wireless medium, a wired medium, an optical fiber cable, a radio frequency (RF), and etc., or, any suitable combination of the foregoing media.

Computer program codes for performing the operations of the present disclosure may be written with one or more programming languages or their combinations, the programming languages include object-oriented programming languages-such as Java, Smalltalk, C++, and further include conventional procedural programming language—such as the "C" language or similar programming language. The program codes may be executed entirely on the user's computer, partly on the user's computer, as a stand-alone software package, partly on the user's computer and partly on a remote computer, or entirely on a remote computer or terminal. Where a remote computer is involved, the remote computer may be connected to the user's computer through any kind of network, including a local area network (LAN) or a (wide area network) WAN, or may be connected to an external computer (e.g., connected through the internet provided by an internet service provider).

In the storage medium according to the embodiment of the present disclosure, multiple neural network operators in a neural network model are acquired; and the multiple neural network operators are fused according to a preset rule to obtain fused neural network operators; and the fused neural network operators are combined into a computation instruction; a computation engine is used to perform computation on the computation instruction, which speeds up the computation process and solves the problem that the computation of data stream cannot be performed in a high speed in the related art, and realizes that the algorithm instruction, after reaching a drive program, is parsed into multiple operators which can be determined as one data stream process, and multiple data stream processes are implemented as a whole into data streams of one neural network, so that the data stream speed can reach the highest rate.

What is claimed is:

1. A computer-implemented data processing method for a neural network model on a computer comprising a processor, wherein the method comprises:

acquiring, using the processor, a plurality of neural network operators in the neural network model;

fusing, using the processor, the plurality of neural network operators according to a preset rule to obtain fused neural network operators;

combining, using the processor, the fused neural network operators into computation instructions; and performing, using the processor, computation on the computation instructions by using a computation engine;

wherein the fusing, using the processor, the plurality of neural network operators according to a preset rule to obtain fused neural network operators comprises: discharging, using the processor, the plurality of neural network operators through convolution, activation function, pooling/up-sampling, shortcut, activation function, and global pooling in sequence, and fusing, using the processor, discharged neural network operators to obtain fused neural network operators.

2. The method according to claim 1, wherein before the fusing, using the processor, the plurality of neural network operators according to a preset rule to obtain fused neural network operators, the method further comprises: determining, using the processor, whether the plurality of neural network operators are fusible, and in response to a determination result in which the plurality of neural network operators are fusible, fusing, using the processor, the plurality of neural network operators according to the preset rule to obtain the fused neural network operators.

3. The method according to claim 2, wherein after the determining whether the plurality of neural network operators are fusible, the method further comprises: acquiring, using the processor, new neural network operators in response to a determination result in which the plurality of neural network operators are not fusible.

4. The method according to claim 1, wherein the performing, using the processor, computation on the computation instructions by using a computation engine comprises: determining, using the processor, whether the computation instructions correspond to only one data stream operation, and performing, using the processor, computation on the computation instruction by using the computation engine in response to a determination result in which the computation instructions correspond to only one data stream operation.

5. The method according to claim 4, wherein after the determining, using the processor, whether the computation instructions correspond to only one data stream operation, the method further comprises: recombining, using the processor, the computation instructions according to the fused neural network operators in response to a determination result in which the computation instructions correspond to not only one data stream operation.

6. The method according to claim 1, wherein before the performing, using the processor, computation on the computation instructions by using a computation engine, the method further comprises: parsing, using the processor, the computation instructions.

7. A computation device, comprising:

one or more processors; and a storage apparatus configured to store one or more programs, wherein the one or more programs, when being executed by the one or more processors, cause the one or more processors to implement:

acquiring a plurality of neural network operators in the neural network model;

fusing the plurality of neural network operators according to a preset rule to obtain fused neural network operators;

combining the fused neural network operators into computation instructions; and performing computation on the computation instructions by using a computation engine;

wherein the one or more programs, when being executed by the one or more processors, cause the one or more processors to implement: discharging the plurality of neural network operators through convolution, activation function, pooling/up-sampling, shortcut, activation function, and global pooling in sequence, and fusing discharged neural network operators to obtain fused neural network operators.

8. The computation device according to claim 7, wherein the one or more programs, when being executed by the one or more processors, cause the one or more processors to implement: determining whether the plurality of neural network operators are fusible, and in response to a determination result in which the plurality of neural network operators are fusible, fusing the plurality of neural network operators according to the preset rule to obtain the fused neural network operators.

9. The computation device according to claim 8, wherein the one or more programs, when being executed by the one or more processors, cause the one or more processors to implement: acquiring new neural network operators in response to a determination result in which the plurality of neural network operators are not fusible.

10. The computation device according to claim 7, wherein the one or more programs, when being executed by the one or more processors, cause the one or more processors to implement: determining whether the computation instructions correspond to only one data stream operation, and performing computation on the computation instruction by using the computation engine in response to a determination result in which the computation instructions correspond to only one data stream operation.

11. The computation device according to claim 10, wherein the one or more programs, when being executed by the one or more processors, cause the one or more processors to implement: recombining the computation instructions according to the fused neural network operators in response to a determination result in which the computation instructions correspond to not only one data stream operation.

12. The computation device according to claim 7, wherein the one or more programs, when being executed by the one or more processors, cause the one or more processors to implement: parsing the computation instructions.

13. A non-transitory computer-readable storage medium having a computer program stored thereon, wherein the computer program comprises program instructions, and the program instructions, when being executed by a processor, implement:

acquiring a plurality of neural network operators in the neural network model;

fusing the plurality of neural network operators according to a preset rule to obtain fused neural network operators;

combining the fused neural network operators into computation instructions; and performing computation on the computation instructions by using a computation engine;

wherein the program instructions, when being executed by the processor, implement discharging the plurality of neural network operators through convolution, activation function, pooling/up-sampling, shortcut, activation function, and global pooling in sequence, and fusing discharged neural network operators to obtain fused neural network operators.

14. The storage medium according to claim 13, wherein the program instructions, when being executed by the processor, implement determining whether the plurality of neural network operators are fusible, and in response to a determination result in which the plurality of neural network operators are fusible, fusing the plurality of neural network operators according to the preset rule to obtain the fused neural network operators.

15. The storage medium according to claim 14, wherein the program instructions, when being executed by the processor, implement acquiring new neural network operators in response to a determination result in which the plurality of neural network operators are not fusible.

16. The storage medium according to claim 13, wherein the program instructions, when being executed by the processor, implement determining whether the computation instructions correspond to only one data stream operation, and performing computation on the computation instruction by using the computation engine in response to a determination result in which the computation instructions correspond to only one data stream operation.

17. The storage medium according to claim 16, wherein the program instructions, when being executed by the processor, implement recombining the computation instructions according to the fused neural network operators in response to a determination result in which the computation instructions correspond to not only one data stream operation.

* * * * *